(12) United States Patent
Chen

(10) Patent No.: US 9,645,402 B2
(45) Date of Patent: May 9, 2017

(54) INTEGRATED IMAGING DISPLAY APPARATUS AND BACKLIGHT MODULE THEREOF

(71) Applicant: Shenzhen China Star Optoelectronics Technology Co., Ltd., Shenzhen, Guangdong (CN)

(72) Inventor: Jianhong Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 377 days.

(21) Appl. No.: 14/407,460

(22) PCT Filed: Nov. 18, 2014

(86) PCT No.: PCT/CN2014/091411
§ 371 (c)(1),
(2) Date: Dec. 11, 2014

(87) PCT Pub. No.: WO2016/074258
PCT Pub. Date: May 19, 2016

(65) Prior Publication Data
US 2016/0131917 A1    May 12, 2016

(30) Foreign Application Priority Data
Nov. 11, 2014  (CN) .......................... 2014 1 0632840

(51) Int. Cl.
*G02B 27/22*    (2006.01)
*F21V 8/00*     (2006.01)
*G02F 1/1335*   (2006.01)

(52) U.S. Cl.
CPC ......... *G02B 27/225* (2013.01); *G02B 6/0066* (2013.01); *G02B 6/0073* (2013.01); *G02B 6/0091* (2013.01); *G02F 1/133603* (2013.01); *G02F 2001/133626* (2013.01)

(58) Field of Classification Search
CPC .. G02B 27/225; G02B 1/1336; G02B 6/0066; G02B 6/0073; G02B 6/0091
See application file for complete search history.

(56) References Cited

FOREIGN PATENT DOCUMENTS

| CN | 202351569 U | 7/2012 |
|---|---|---|
| CN | 102692722 A | 9/2012 |

*Primary Examiner* — Joseph L Williams
(74) *Attorney, Agent, or Firm* — Andrew C. Cheng

(57) ABSTRACT

The present invention provides an integrated imaging display apparatus and backlight module thereof. The integrated imaging display apparatus comprises a switchable backlight module and a liquid crystal display panel, wherein the switchable backlight module is switched at least between a first operation mode and a second operation mode, with the first operation mode being a dot matrix backlight formed by a dot light source matrix so that 3D display could be performed by the integrated imaging display apparatus, and the second operation mode being a surface backlight so that 2D display could be performed by the integrated imaging display apparatus. Through the solution mentioned above, the 2D/3D display switching can be accomplished by switching the operation modes of the backlight module in the present invention.

17 Claims, 3 Drawing Sheets

INTEGRATED IMAGING DISPLAY APPARATUS AND BACKLIGHT MODULE THEREOF

FIELD OF THE INVENTION

The present invention relates to a 3D display technique field, and more particularly to an integrated imaging display apparatus and backlight module thereof.

BACKGROUND OF THE INVENTION

As improving in the 3D display technology, a bare-eye 3D display ability, of which the 3D effect could be observed directly by human eyes without wearing equipment such as 3D glasses any more, is accomplished by many 3D display apparatus. However, the 3D display technology needs be improved in a current phase. When the situation of larger image variation frequency occurs, frame switching of the 3D image by the 3D display apparatus in the current phase is not fluent and is easy to bring the viewers the feeling of dizziness, so that the viewers would like to watch a 2D image. Therefore, it is necessary to design a 2D/3D switchable display apparatus.

In the 3D display technique field, a 2D/3D switchable display apparatus has already been invented. The invented display apparatus accomplishes 2D/3D switching by adjusting a liquid crystal light valve in the display apparatus. However, the cost of manufacturing the display apparatus using the liquid crystal light valve is too expensive to be accepted by the customers when the display apparatus is sold on the market.

SUMMARY OF THE INVENTION

A main technique problem solved by the present invention is to provide an integrated imaging display apparatus and backlight module thereof so that 2D/3D switching could be accomplished and the cost of manufacturing a 2D/3D switchable display apparatus could be reduced.

In order to solve the technique problem mentioned above, one technique solution adopted by the present invention is: an integrated imaging display apparatus comprising a switchable backlight module and a liquid crystal display panel; the switchable backlight module being switched at least between a first operation mode and a second operation mode, with the first operation mode being a dot matrix backlight formed by a dot light source matrix so that 3D display could be performed by the integrated imaging display apparatus, and the second operation mode being a surface backlight so that 2D display could be performed by the integrated imaging display apparatus; the surface backlight being an edge-lit backlight comprising a light source and a light guiding plate, wherein the light source is LED, OLED or electroluminescence source being disposed on at least one side of the light guiding plate to form the surface backlight when being coupled to or surrounding the light guiding plate; a switch of the dot light source matrix and the light source being controlled individually, and the switch being controlled by an external circuitry in order to control on/off of the light source in different areas so that 2D display and 3D display are performed together.

Wherein, the switchable backlight module comprises the dot light source matrix, a pinhole matrix unit and a pinhole surface light source stacked in sequence, the pinhole surface light source is disposed near to the liquid crystal display panel and a first pinhole matrix is disposed in the pinhole surface light source, a second pinhole matrix is disposed in the pinhole matrix unit, and each dot light source in the dot light source matrix, each pinhole in the first pinhole matrix and each pinhole in the second pinhole matrix are one-by-one correspondingly disposed; the pinhole matrix is transparent at the pinhole and is opaque at other locations; the pinhole surface light source does not emit light and the dot light source matrix emits light when the switchable backlight module is operated in the first operation mode; and the pinhole surface light source and the dot light source matrix emit light together when the switchable backlight module is operated in the second operation mode.

Wherein, the dot light source matrix comprising LED dot light source, OLED dot light source or electroluminescence dot light source; the pinhole surface light source comprising LED surface light source, OLED surface light source or electroluminescence surface light source.

Wherein, a location in the pinhole surface light source corresponding to the pinhole of the pinhole matrix unit is excavated, and a shape and an area of the excavated location is near or the same as the shape and the area of the pinhole of the pinhole matrix unit.

In order to solve the problem mentioned above, the present invention provides an integrated imaging display apparatus comprising a switchable backlight module and a liquid crystal display panel; wherein the switchable backlight module is switched at least between a first operation mode and a second operation mode, with the first operation mode being a dot matrix backlight formed by a dot light source matrix so that 3D display could be performed by the integrated imaging display apparatus, and the second operation mode being a surface backlight so that 2D display could be performed by the integrated imaging display apparatus.

Wherein, the switchable backlight module comprises the dot light source matrix, a pinhole matrix unit and a pinhole surface light source stacked in sequence, the pinhole surface light source is disposed near to the liquid crystal display panel and a first pinhole matrix is disposed in the pinhole surface light source, a second pinhole matrix is disposed in the pinhole matrix unit, and each dot light source in the dot light source matrix, each pinhole in the first pinhole matrix and each pinhole in the second pinhole matrix are one-by-one correspondingly disposed; the pinhole matrix is transparent at the pinhole and is opaque at other locations; the pinhole surface light source does not emit light and the dot light source matrix emits light when the switchable backlight module is operated in the first operation mode; and the pinhole surface light source and the dot light source matrix emit light together when the switchable backlight module is operated in the second operation mode.

Wherein, the dot light source matrix comprises LED dot light source, OLED dot light source or electroluminescence dot light source; and the pinhole surface light source comprises LED surface light source, OLED surface light source or electroluminescence surface light source.

Wherein, a switch of the dot light source matrix and the pinhole surface light source is controlled individually, and the switch is controlled by an external circuitry in order to control on/off of the pinhole surface light source in different areas so that 2D display and 3D display are performed together.

Wherein, a location in the pinhole surface light source corresponding to the pinhole of the pinhole matrix unit is excavated, and a shape and an area of the excavated location is near or the same as the shape and the area of the pinhole of the pinhole matrix unit.

Wherein, the switchable backlight is an edge-lit backlight comprising a light source and a light guiding plate, the light source is LED light source, OLED light source or electroluminescence light source being disposed on at least one side of the light guiding plate to form the pinhole surface light source when the light source is coupled to or surrounding the light guiding plate and a pinhole matrix is disposed at a surface of the light guiding plate.

In order to solve the problem mentioned above, another technique solution adopted by the present invention is to provide a backlight module of integrated imaging display apparatus, wherein the backlight module is switched at least between a first operation mode and a second operation mode, with the first operation mode being a dot matrix backlight formed by a dot light source matrix so that 3D display could be performed by the integrated imaging display apparatus, and the second operation mode being a surface backlight so that 2D display could be performed by the integrated imaging display apparatus.

Wherein, the backlight module comprises the dot light source matrix, a pinhole matrix unit and a pinhole surface light source stacked in sequence, a first pinhole matrix is disposed in the pinhole surface light source, a second pinhole matrix is disposed in the pinhole matrix unit, and each dot light source in the dot light source matrix, each pinhole in the first pinhole matrix and each pinhole in the second pinhole matrix are one-by-one correspondingly disposed; the pinhole matrix is transparent at the pinhole and is opaque at other locations; the pinhole surface light source does not emit light and the dot light source matrix emits light when operating in the first operation mode, and the pinhole surface light source and the dot light source matrix emit light together when switching to the second operation mode.

Wherein, the dot light source matrix comprises LED dot light source, OLED dot light source or electroluminescence dot light source; and the pinhole surface light source comprises LED surface light source, OLED surface light source or electroluminescence surface light source.

Wherein, the backlight module is an edge-lit backlight module comprising a light source and a light guiding plate, the light source is LED light source, OLED light source or electroluminescence light source being disposed on at least one side of the light guiding plate to form the pinhole surface light source when the light source is coupled to or surrounding the light guiding plate and a pinhole matrix is disposed at a surface of the light guiding plate.

The efficacy of the present invention is that, different from the prior arts, the present, the present invention provides an integrated imaging display apparatus and backlight module thereof, wherein the backlight module of the apparatus is a switchable backlight module, with being a surface light source backlight when the display apparatus is for 2D display and being a dot matrix backlight when the display apparatus is for 3D display. By switching the backlight, the present invention accomplishes the switching of 2D/3D. Furthermore, the two backlights in the present invention could be formed by the normal dot light source matrix and surface light source. Compared with the liquid crystal valve, the cost of manufacturing the display apparatus of the present invention is reduced while providing a similar effect.

DETAILED DESCRIPTION OF PREFERRED EMBODIMENTS

The following combines drawings and embodiments to describe the present invention in details.

Figure 1:
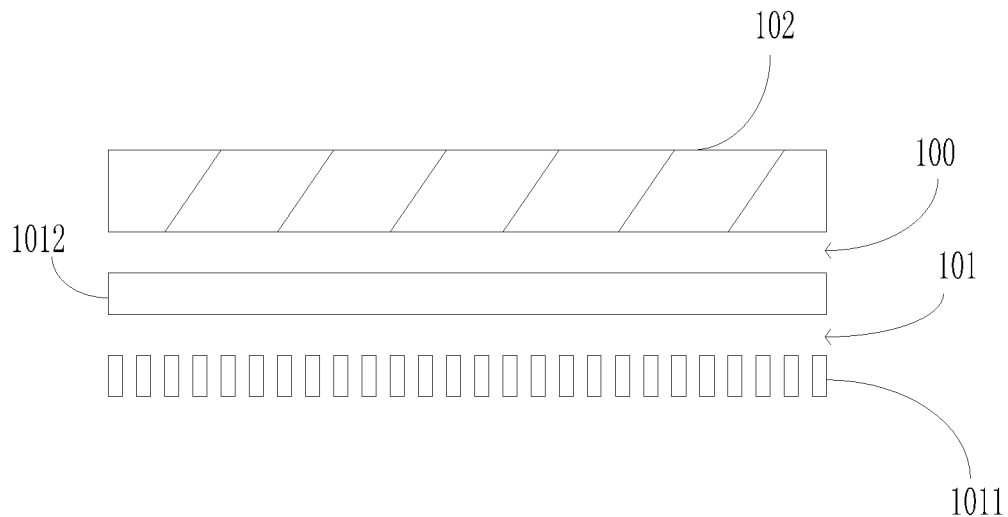
FIG. 1 is a schematic diagram of the integrated imaging display apparatus according to a first embodiment of the present invention.

Please refer to FIG. 1, FIG. 1 is a schematic diagram of the integrated imaging display apparatus according to a first embodiment of the present invention. The display apparatus 100 comprises a switchable backlight module 101 and a liquid crystal display panel 102.

Wherein, the liquid crystal display panel 102 is an apparatus for displaying image by using the electric-optical characteristic of the liquid crystal molecule, and is widely applied in the equipment such as mobile phone, computer, liquid crystal TV, etc. An element pixel matrix comprising data of 3D scene is displayed on the liquid crystal display panel 102. The switchable backlight module 101 comprises a dot light source matrix 1011 and a surface light source 1012. The dot light source matrix 1011 and the surface light source 1012 is stacked in sequence and the surface light source 1012 is disposed near the liquid crystal display panel 102. A plurality of dot light source being aligned into a certain amount of rows and columns forms a matrix in the dot light source matrix 1011, and each dot light source (not labeled) in the dot light source matrix 1011 emits the light to a fixed direction. The surface light source 1012 is a light emitting object, and the light emitted therefrom is disordered and is not fixed to a certain direction.

When operated in the display apparatus 100, the backlight module 101 in the present embodiment can be switched between a first operation mode and a second operation mode, and at least one of the two modes is selected during operation of the display apparatus 100. The first operation mode of the display apparatus 100 is to adopt the dot matrix backlight (not shown) formed by light emitted from the dot light source matrix unit 1011. As described above, each dot light source in the dot light source matrix unit 1011 emits the light to a fixed direction, and the light with fixed direction emitted by the dot light sources could penetrate the surface light source 1012 and project onto the liquid crystal display panel 102. The element pixel matrix displayed on the liquid crystal display panel 102 comprises data of 3D scene so that the 3D scene is reconstructed when the light with fixed direction emitted from the dot light source of the dot light source matrix 1011 is projected onto the liquid crystal display panel 102, and a 3D frame is shown above the liquid crystal display panel 102 and the 3D display is accomplished by the display apparatus 100 under the first operation mode. The second operation mode of the display apparatus 100 is to adopt the surface light source backlight (not shown) formed by light emitted from the surface light source 1012. The light emitted from the surface light source 1012 is disordered and is projected to random directions so that there's no effect when the light is projected to the 3D scene on the liquid crystal display panel 102, and the display apparatus 100 accomplishes 2D display, being equal to a normal 2D liquid crystal display apparatus at this time.

Different from the prior art, the backlight module of the integrated imaging display apparatus provided by the present invention is a switchable backlight module, and the backlight module is a surface light source backlight when the display apparatus is for 2D display and the backlight module is a dot matrix backlight when the display apparatus is for 3D display. By switching the backlight, the present invention accomplishes the switching of 2D/3D display. Furthermore, the two backlights in the present invention could be formed by the normal dot light source matrix and surface light source. Compared with the display apparatus using liquid crystal valve for accomplishing switchable 2D/3D display, the cost of manufacturing the display apparatus of the present invention is much lower while providing a similar effect.

Figure 2:
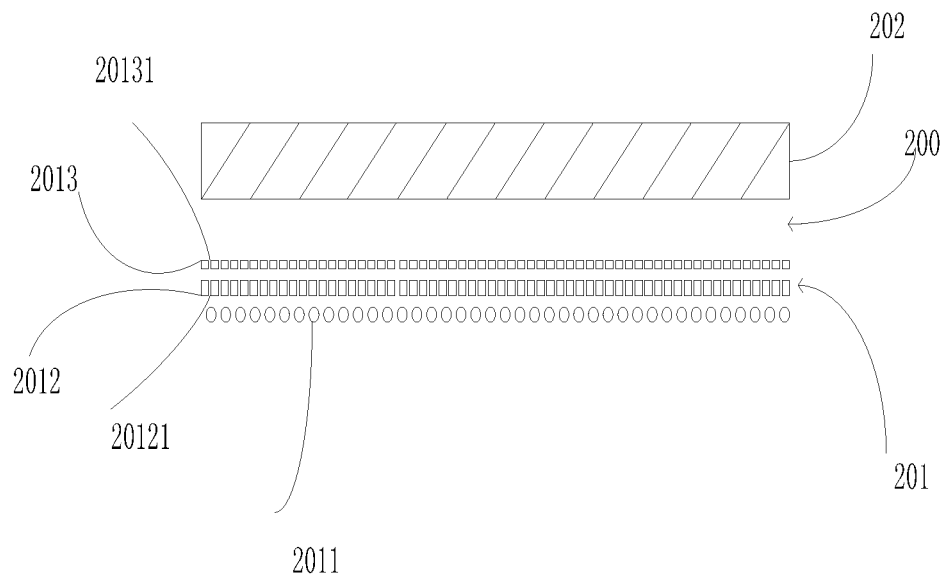
FIG. 2 is a schematic diagram of the integrated imaging display apparatus according to a second embodiment of the present invention.

Please refer to FIG. 2, FIG. 2 is a schematic diagram of the integrated imaging display apparatus according to a second embodiment of the present invention. The display apparatus 200 comprises a switchable backlight 201 and liquid crystal display panel 202.

Wherein, the liquid crystal display panel 202 is similar to or the same as the liquid crystal display panel described in the first embodiment, and would not be described again. The switchable backlight 201 comprises a dot light source matrix 2011, a pinhole array unit 2012 and a pinhole surface light source 2013, wherein the dot light source matrix 2011, the pinhole matrix unit 2012 and the pinhole surface light source 2013 are stacked in sequence. The pinhole surface light source 2013 is disposed near the liquid crystal display panel 202.

A plurality of dot light source (not labeled) being aligned into a certain amount of rows and columns forms a matrix in the dot light source matrix 2011, and light emitted from each dot light source is disordered and is projected to random directions. A second pinhole matrix 20121 is disposed in the pinhole matrix unit 2012, and, in the pinhole matrix unit 2012, each pinhole (not labeled) of the second pinhole array 20121 is transparent while other locations are opaque materials. A first pinhole array 20131 is disposed in the pinhole surface light source 2013, and the locations except each pinhole (not labeled) of the first pinhole matrix 20131 are light emitting objects. In the embodiment, the dot light source matrix 2011 and the pinhole surface light source 2013 adopts LED light source, OLED light source or electroluminescence light source. Each dot light source in the dot light source matrix 2011, each pinhole of the first pinhole matrix 20131 in the pinhole surface light source 2013, and each pinhole of the second pinhole matrix 20121 in the pinhole matrix unit 2012 are one-by-one correspondingly disposed, with being aligned.

When the display apparatus 200 of the present invention operates, there are two operation modes existed in the switchable backlight module 201: a first operation mode and a second operation mode. When the switchable backlight module 201 is operated in the first operation mode, the pinhole surface light source 2013 of the switchable backlight module 201 does not emit light and the dot light source matrix 2011 emits light. At this time, light emitted from each dot light source of the dot light source matrix 2011 is projected to the pinhole matrix unit 2012 and the pinhole surface light source 2013, and passes through the second pinhole matrix 20121 and the first pinhole matrix 20131. After passing through the first pinhole matrix 20131, the light is projected onto the liquid crystal display panel 202 and the 3D scene is reconstructed above the liquid crystal display panel 202 according to the data of 3D scene on the liquid crystal display panel 202, so that the 3D display of the display apparatus 200 is accomplished. When the switchable backlight module 201 is operated in the second operation mode, the pinhole surface light source 2013 and the dot light source matrix 2011 of the switchable backlight module 201 emit light together, and, as a whole, the light is emitted in a way of surface light source. Although the first pinhole matrix 20131 is disposed in the pinhole surface light source 2013, the switchable backlight module 201 is equal to a normal backlight since the area of the transparent pinhole is small and the dot light source matrix 2011 below is emitting light. The light projected to the liquid crystal display panel 202 accomplishes the 2D display for the display apparatus 200. In the embodiment, switching of 2D/3D display for display apparatus 200 can be accomplishes through controlling the light emitting status of the pinhole surface light source 2013.

Different from the prior art, in the display apparatus provided by the embodiment, the pinhole surface light source is turned off and the light emitted from the dot light source of the dot light source matrix passes through the two pinhole matrix in the pinhole matrix unit and the pinhole surface light source, so that only a little amount of light, which is straightly projected to or with a small angle away from being straightly projected to the liquid crystal display panel, can be projected onto the liquid crystal display panel, and the 3D display is accomplishes through rebuilding the 3D scene by the light according to the data of 3D scene on the liquid crystal display panel; and the 2D display can be accomplishes through turning on the pinhole surface light source so that the backlight is switched to an ordinary backlight. The switchable 2D/3D display can be accomplished through controlling on/off of the pinhole surface light source.

Figure 3:
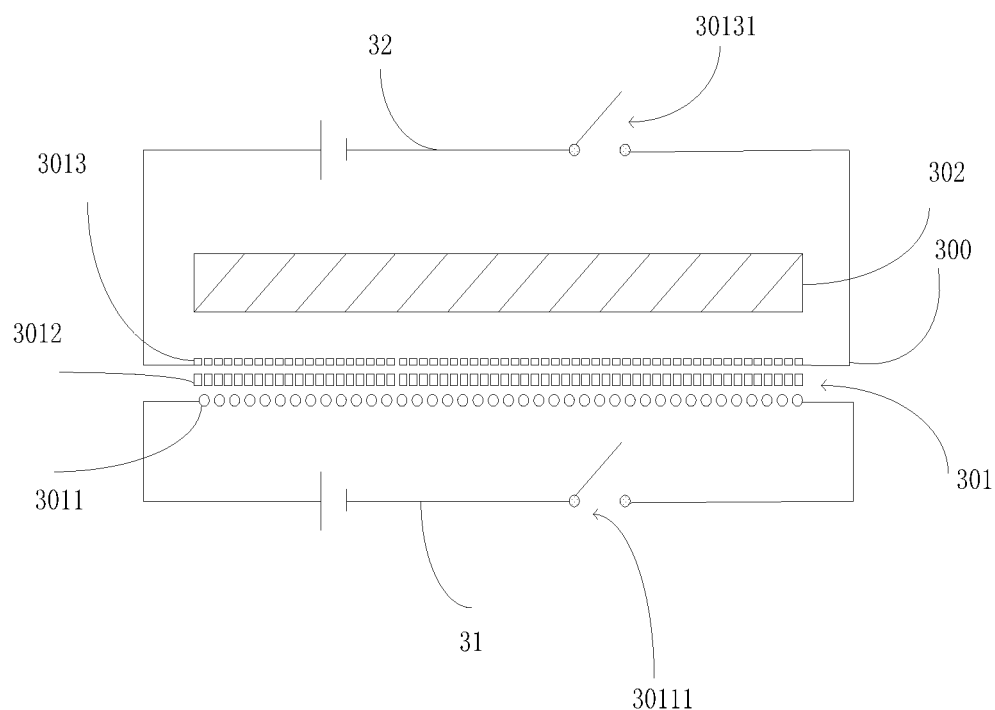
FIG. 3 is a schematic diagram of the integrated imaging display apparatus according to a third embodiment of the present invention.
Figure 4:
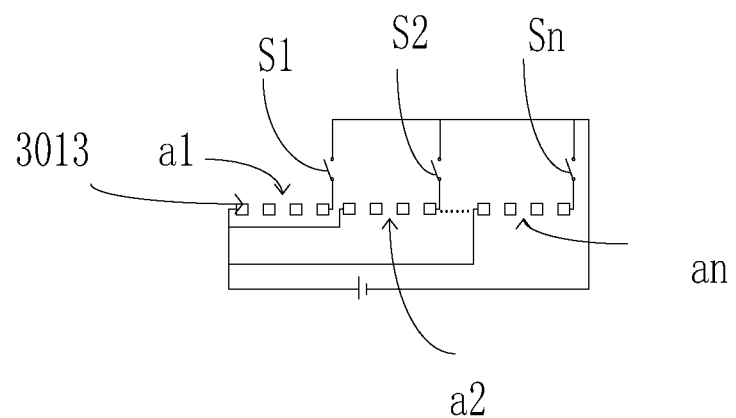
FIG. 4 is a schematic diagram of circuitry controlling when 2D and 3D is displayed together in the integrated imaging display apparatus according to the third embodiment of the present invention.

Please refer to FIG. 3 and FIG. 4, FIG. 3 is a schematic diagram of the integrated imaging display apparatus according to a third embodiment of the present invention, and FIG. 4 is a schematic diagram of circuitry controlling when 2D and 3D is displayed together in the integrated imaging display apparatus according to the third embodiment of the present invention. The display apparatus 300 comprises a switchable backlight 301 and a liquid crystal display panel 302.

Wherein, the liquid crystal display panel 302 is similar to or the same as the liquid crystal display panel described in the first embodiment, and would not be described again. The switchable backlight 301 comprises a dot light source matrix 3011, a pinhole array unit 3012 and a pinhole surface light source 3013, and the way disposing the three objects are similar to or the same as the second embodiment of the present invention.

The dot light source matrix 3011 comprises a dot light source matrix unit 30111 and a first external circuitry controlling switch 30112, and the pinhole surface light source 3013 comprises a pinhole surface light source unit 30131 and a second external circuitry controlling switch 30132. The first external circuitry controlling switch 30112 is in a circuitry 31 the same as the dot light source matrix unit 30111, and the second external circuitry controlling switch 30132 is in a circuitry 32 the same as the pinhole surface light source unit 30131. Independent power sources (not labeled) in the circuitry 31 and circuitry 32 respectively provide energy to the dot light source matrix unit 30111 and the pinhole surface light source unit 30131, and on/off of the circuitry 31 and circuitry 32 are controlled by the first external circuitry controlling switch 30112 and the second external circuitry controlling switch 30132, respectively.

When the display apparatus 300 of the embodiment operates, there are also two operation modes existed in the switchable backlight module 301: the first operation mode and the second operation mode. When the switchable backlight module 301 operates in the first operation mode, the first external circuitry controlling switch 30112 is turned on and the second external circuitry controlling switch 30132 is turned off. At this time, the dot source matrix unit 30111 emits light, the pinhole surface light source unit 30131 does not emit light, and the display apparatus 300 is for 3D display. When the switchable backlight module 301 operates in the second operation mode, the second external circuitry controlling switch 30132 is turned on so that the pinhole surface light source unit 30131 emits light as well at this time, and the display apparatus 300 is for 2D display. In the embodiment, the 2D/3D mode switching for the display apparatus 300 can be accomplished merely by controlling on/off of the second external circuitry controlling switch 30132. The first external circuitry controlling switch 30112 can be selected to be turned off while switching to the 2D mode because only the pinhole surface light source unit 30131 is needed to emit light in the 2D mode, and therefore power can be saved by turning off the first external circuitry controlling switch 30112.

In the embodiment, when on/off of the light sources of the pinhole surface light source 3013 can be divided into regions and each region is a unit controlled by the second external circuitry controlling switch 30132, such as the pinhole surface light source 3013 being divided into several parts a1, a2, . . . , an, and each part being parallel connected into the circuitry after serially connected to a switch, conductivity of each part of the pinhole surface light source 3013 can be controlled by the switches S1, S2, . . . , Sn at the same time. By controlling the pinhole surface light source 3013 through the switches so that a part of the regions of the pinhole surface light source 3013 emit light when other regions do not emit light, it can be accomplished that 2D display and 3D display could exist on the liquid crystal display panel 302 simultaneously.

Different from the prior art, the 2D/3D mode switching for display apparatus can be accomplished in the display apparatus provided by the embodiment through controlling the light emitting situation of the pinhole surface light source when the dot light source matrix emits light, and, at the same time when the display apparatus performs 2D display, the switch of the power of the dot light source matrix could be selected to be turned off so that electrical energy can be saved. At the same time, when the dot light source matrix emits light, the 2D display and 3D display can exists in the same liquid crystal display panel through controlling the pinhole surface light source by the switches for emitting light from a part of regions of the pinhole surface light source and not emitting light from another part of regions of the pinhole surface light source.

Figure 5:
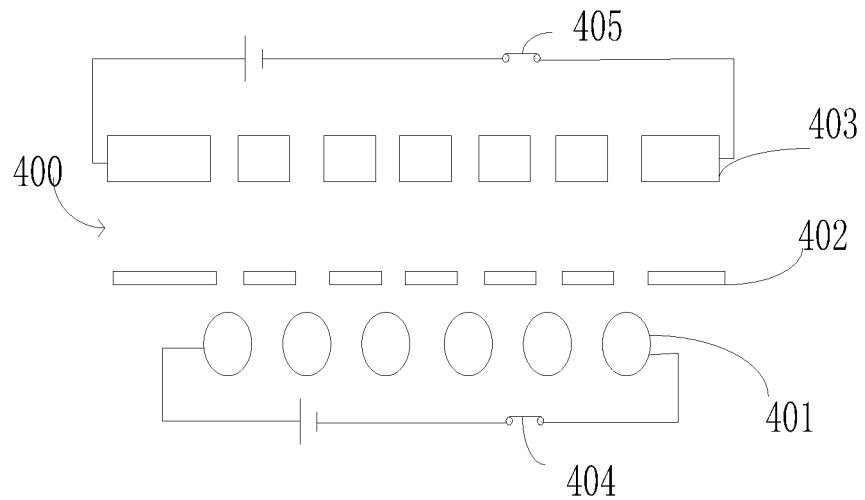
FIG. 5 is a schematic diagram of the backlight module of the integrated imaging display apparatus according to a first embodiment of the present invention.
Figure 6:
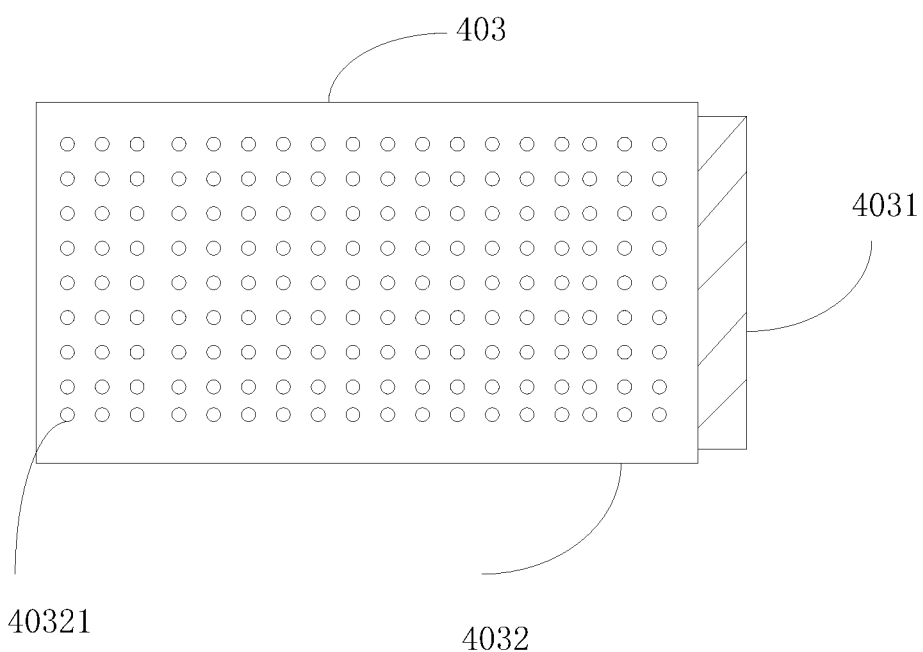
FIG. 6 is a schematic diagram of the pinhole surface light source using the light guiding plate in the backlight module of the integrated imaging display apparatus according to the first embodiment of the present invention.

Please refer to FIG. 5 and FIG. 6, FIG. 5 is a schematic diagram of the backlight module of the integrated imaging display apparatus according to a first embodiment of the present invention, and FIG. 6 is a schematic diagram of the pinhole surface light source using the light guiding plate in the backlight module of the integrated imaging display apparatus according to the first embodiment of the present invention. The backlight module 400 comprises a dot light source matrix unit 401, a pinhole matrix unit 402, a pinhole surface light source unit 403, a dot light matrix power controlling switch 404 and a pinhole surface light source power controlling switch 405.

Wherein, the dot light source matrix unit 401, the pinhole matrix unit 402 and the pinhole surface light source unit 403 are similar to or the same as the dot light source matrix, pinhole matrix and pinhole surface light source in the display apparatus of second embodiment described above. The dot light matrix power controlling switch 404 controls power (not labeled) on/off of the dot light source matrix unit 401, and the pinhole surface light source power controlling switch 405 controls power (not labeled) on/off of the pinhole surface light source unit 403.

When the switchable backlight module operates in the first operation mode, the integrated imaging display apparatus (not shown) accomplishes 3D display, and, at this time, the dot light source matrix power controlling switch 404 is turned on, the pinhole surface light source power controlling switch 405 is turned off, and light emitted from each dot light source of the dot light source matrix unit 401 is projected onto the liquid crystal display panel (not shown) after penetrating the pinhole matrices disposed in the pinhole matrix unit 402 and pinhole surface light source unit 403, so that the 3D scene is reconstructed above the liquid crystal display panel according to the data of the 3D scene on the liquid crystal display panel, and 3D display is accomplished. When the switchable backlight module operates in the second operation mode, the integrated imaging display apparatus accomplishes 2D display, and, at this time, the dot light source matrix power controlling switch 404 is turned on, the pinhole surface light source power controlling switch 405 is turned on, and light emitted from the pinhole surface light source unit 403 is directly projected onto the liquid crystal display panel from random directions, so that the 3D scene cannot be reconstructed according to the data of 3D scene and there is still 2D display.

At the same time, the pinhole surface light source unit 403 could be formed by aligning light emitting substance, such as LED, OLED or electroluminescence light source, into a line light source 4031; disposing the line light source 4031 on at least one side of a light guiding plate 4032; and disposing a light guiding plate pinhole matrix 40321 on the light guiding plate 4032, wherein the pinhole of the light guiding plate pinhole matrix 40321 is one-by-one corresponding to each pinhole of the pinhole matrix 402. The pinhole surface light source 403 formed by this solution functions the same as the pinhole surface light sources aforementioned and described in all the embodiments above.

Different from the prior art, through the switchable display method using switch and the pinhole surface light source formed by light source and light guiding plate, the backlight module provided by the embodiment can save power for electroluminescence and greatly reduce the cost of manufacturing.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An integrated imaging display apparatus comprising a switchable backlight module and a liquid crystal display panel;
the switchable backlight module being switched at least between a first operation mode and a second operation mode, with the first operation mode being a dot matrix backlight formed by a dot light sourcematrix so that 3D display could be performed by the integrated imaging display apparatus, and the second operation mode being a surface backlight so that 2D display could be performed by the integrated imaging display apparatus;
the surface backlight being an edge-lit backlight comprising a light source and a light guiding plate, wherein the light source is LED, OLED or electroluminescence source being disposed on at least one side of the light guiding plate to form the surface backlight when being coupled to or surrounding the light guiding plate; a switch of the dot light sourcematrix and the light source being controlled individually, and the switch being controlled by an external circuitry in order to control on/off of the light source in different areas so that 2D display and 3D display are performed together.

2. The integrated imaging display apparatus according to claim 1, wherein
the switchable backlight module comprises the dot light sourcematrix, a pinhole matrix unit and a pinhole surface light source stacked in sequence, the pinhole surface light source is disposed near to the liquid crystal display panel and a first pinhole matrix is disposed in the pinhole surface light source, a second pinhole matrix is disposed in the pinhole matrix unit, and each dot light source in the dot light source matrix, each pinhole in the first pinhole matrix and each pinhole in the second pinhole matrix are one-by-one correspondingly disposed; the pinhole matrix is transparent at the pinhole and is opaque at other locations; the pinhole surface light source does not emit light and the dot light source matrix emits light when the switchable backlight module is operated in the first operation mode; and the pinhole surface light source and the dot light source matrix emit light together when the switchable backlight module is operated in the second operation mode.

3. The integrated imaging display apparatus according to claim 2, wherein
the dot light source matrix comprising LED dot light source, OLED dot light source or electroluminescence dot light source; the pinhole surface light source comprising LED surface light source, OLED surface light source or electroluminescence surface light source.

4. The integrated imaging display apparatus according to claim 3, wherein
a location in the pinhole surface light source corresponding to the pinhole of the pinhole matrix unit is excavated, and a shape and an area of the excavated location is near or the same as the shape and the area of the pinhole of the pinhole matrix unit.

5. The integrated imaging display apparatus according to claim 2, wherein
a location in the pinhole surface light source corresponding to the pinhole of the pinhole matrix unit is excavated, and a shape and an area of the excavated location is near or the same as the shape and the area of the pinhole of the pinhole matrix unit.

6. An integrated imaging display apparatus comprising a switchable backlight module and a liquid crystal display panel;
the switchable backlight module being switched at least between a first operation mode and a second operation mode, with the first operation mode being a dot matrix backlight formed by a dot light source matrix so that 3D display could be performed by the integrated imaging display apparatus, and the second operation mode being a surface backlight so that 2D display could be performed by the integrated imaging display apparatus.

7. The integrated imaging display apparatus according to claim 6, wherein
the switchable backlight module comprises the dot light source matrix, a pinhole matrix unit and a pinhole surface light source stacked in sequence, the pinhole surface light source is disposed near to the liquid crystal display panel and a first pinhole matrix is disposed in the pinhole surface light source, a second pinhole matrix is disposed in the pinhole matrix unit, and each dot light source in the dot light source matrix, each pinhole in the first pinhole matrix and each pinhole in the second pinhole matrix are one-by-one correspondingly disposed; the pinhole matrix is transparent at the pinhole and is opaque at other locations; the pinhole surface light source does not emit light and the dot light source matrix emits light when the switchable backlight module is operated in the first operation mode; and the pinhole surface light source and the dot light source matrix emit light together when the switchable backlight module is operated in the second operation mode.

8. The integrated imaging display apparatus according to claim 7, wherein
the dot light source matrix comprises LED dot light source, OLED dot light source or electroluminescence dot light source; and the pinhole surface light source comprises LED surface light source, OLED surface light source or electroluminescence surface light source.

9. The integrated imaging display apparatus according to claim 7, wherein
a switch of the dot light source matrix and the pinhole surface light source is controlled individually, and the switch is controlled by an external circuitry in order to control on/off of the pinhole surface light source in different areas so that 2D display and 3D display are performed together.

10. The integrated imaging display apparatus according to claim 9, wherein
a location in the pinhole surface light source corresponding to the pinhole of the pinhole matrix unit is excavated, and a shape and an area of the excavated location is near or the same as the shape and the area of the pinhole of the pinhole matrix unit.

11. The integrated imaging display apparatus according to claim 8, wherein
a location in the pinhole surface light source corresponding to the pinhole of the pinhole matrix unit is excavated, and a shape and an area of the excavated location is near or the same as the shape and the area of the pinhole of the pinhole matrix unit.

12. The integrated imaging display apparatus according to claim 7, wherein
a location in the pinhole surface light source corresponding to the pinhole of the pinhole matrix unit is excavated, and a shape and an area of the excavated location is near or the same as the shape and the area of the pinhole of the pinhole matrix unit.

13. The integrated imaging display apparatus according to claim 7, wherein
the surface backlight is an edge-lit backlight comprising a light source and a light guiding plate, the light source is LED light source, OLED light source or electroluminescence light source being disposed on at least one side of the light guiding plate to form the pinhole surface light source when the light source is coupled to or surrounding the light guiding plate and a pinhole matrix is disposed at a surface of the light guiding plate.

14. A backlight module of integrated imaging display apparatus, wherein
the backlight module is switched at least between a first operation mode and a second operation mode, with the first operation mode being a dot matrix backlight formed by a dot light source matrix so that 3D display could be performed by the integrated imaging display apparatus, and the second operation mode being a surface backlight so that 2D display could be performed by the integrated imaging display apparatus.

15. The backlight module according to claim 14, wherein the switchable backlight module comprises the dot light source matrix, a pinhole matrix unit and a pinhole surface light source stacked in sequence, a first pinhole matrix is disposed in the pinhole surface light source, a second pinhole matrix is disposed in the pinhole matrix unit, and each dot light source in the dot light source matrix, each pinhole in the first pinhole matrix and each pinhole in the second pinhole matrix are one-by-one correspondingly disposed; the pinhole matrix is transparent at the pinhole and is opaque at other locations; the pinhole surface light source does not emit light and the dot light source matrix emits light when operating in the first operation mode, and the pinhole surface light source and the dot light source matrix emit light together when switching to operate in the second operation mode.

16. The backlight module according to claim 15, wherein the dot light source matrix comprises LED dot light source, OLED dot light source or electroluminescence dot light source; and the pinhole surface light source comprises LED surface light source, OLED surface light source or electroluminescence surface light source.

17. The backlight module according to claim 15 wherein the backlight module is an edge-lit backlight module comprising a light source and a light guiding plate, the light source is LED light source, OLED light source or electroluminescence light source being disposed on at least one side of the light guiding plate to form the pinhole surface light source when the light source is coupled to or surrounding the light guiding plate and a pinhole matrix is disposed at a surface of the light guiding plate.

* * * * *